United States Patent
Lee et al.

(10) Patent No.: US 10,720,977 B2
(45) Date of Patent: *Jul. 21, 2020

(54) CHANNEL STATE INFORMATION TRANSMISSION/RECEPTION METHOD AND APPARATUS OF DOWNLINK COORDINATED MULTI-POINT COMMUNICATION SYSTEM

(71) Applicant: Samsung Electronics Co., Ltd., Suwon-si, Gyeonggi-do (KR)

(72) Inventors: Hyojin Lee, Suwon-si (KR); Younsun Kim, Seongnam-si (KR); Kiil Kim, Yongin-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

This patent is subject to a terminal disclaimer.

(21) Appl. No.: 14/839,205

(22) Filed: Aug. 28, 2015

(65) Prior Publication Data
US 2015/0372742 A1    Dec. 24, 2015

Related U.S. Application Data

(63) Continuation of application No. 13/856,134, filed on Apr. 3, 2013, now Pat. No. 9,124,330.

(30) Foreign Application Priority Data

Apr. 2, 2013    (KR) .................. 10-2013-0035869

(51) Int. Cl.
*H04W 84/04*    (2009.01)
*H04B 7/06*    (2006.01)
(Continued)

(52) U.S. Cl.
CPC ........... *H04B 7/0632* (2013.01); *H04B 7/024* (2013.01); *H04B 7/0639* (2013.01); *H04L 5/001* (2013.01);
(Continued)

(58) Field of Classification Search
None
See application file for complete search history.

(56) References Cited

U.S. PATENT DOCUMENTS 9,124,330 B2 *    9/2015    Lee .................... H04B 7/0632
9,532,362 B2 *    12/2016    Marinier ............ H04W 72/06
(Continued)

FOREIGN PATENT DOCUMENTS

WO    2011-047077 A2    4/2011

OTHER PUBLICATIONS

LG Electronics, 'Consideration on Aggregated Feedback', R1-120433, Feb. 6-10, 2012, 3GPP TSG-RAN WG1 Meeting #68, Dresden, Germany.
(Continued)

*Primary Examiner* — Willie J Daniel, Jr.
(74) *Attorney, Agent, or Firm* — Jefferson IP Law, LLP

(57)    ABSTRACT

A Channel State Information (CSI) transmission/reception method and an apparatus for transmitting/receiving CSI efficiently in a Coordinated Multi-Point (CoMP) communication system are provided. The CSI transmission method of a terminal for receiving Joint Transmission (JT) from a first Transmission Point (TP) and a second TP includes receiving a first CSI Reference Signal (CSI-RS) corresponding to the first TP, receiving a second CSI-RS corresponding to the second TP, generating an aggregated CSI corresponding to the first and second CSI-RSs, and transmitting the aggregated CSI, wherein generating an aggregated CSI comprising creating the aggregated CSI with a transmission timing
(Continued)

of the aggregated CSI. The CSI transmission/reception method and apparatus is capable of transmission CSI efficiently in the CoMP system.

10 Claims, 9 Drawing Sheets

Related U.S. Application Data

(60) Provisional application No. 61/621,168, filed on Apr. 6, 2012.

(51) Int. Cl.
*H04L 5/00* (2006.01)
*H04B 7/024* (2017.01)

(52) U.S. Cl.
CPC .......... *H04L 5/0035* (2013.01); *H04L 5/0048* (2013.01); *H04L 5/0057* (2013.01); *H04L 5/0078* (2013.01); *H04L 5/0094* (2013.01); *H04B 7/063* (2013.01)

(56) References Cited

U.S. PATENT DOCUMENTS

| | | | |
|---|---|---|---|
| 10,014,911 B2* | 7/2018 | Marinier | H04B 7/024 |
| 2009/0046674 A1 | 2/2009 | Gao et al. | |
| 2011/0034175 A1 | 2/2011 | Fong et al. | |
| 2011/0170435 A1* | 7/2011 | Kim | H04L 5/0023 370/252 |
| 2011/0249584 A1* | 10/2011 | Barbieri | H04L 1/0026 370/252 |
| 2012/0176996 A1 | 7/2012 | Kim et al. | |
| 2012/0257575 A1 | 10/2012 | Davydov et al. | |
| 2012/0275507 A1 | 11/2012 | Roman et al. | |
| 2013/0315197 A1 | 11/2013 | Park et al. | |
| 2014/0247749 A1 | 9/2014 | Kim et al. | |
| 2015/0016295 A1* | 1/2015 | Ebrahimi Tazeh Mahalleh | H04L 5/0057 370/252 |

OTHER PUBLICATIONS

MediaTek Inc. 'On the need of aggregated CQI and inter-CSI-RS-resource feedback for CoMP', R1-120623, Feb. 6-10, 2012, 3GPP TSG-RAN WG1 #68, Dresden, Germany.

Nokia Siemens Networks et al., 'Aggregated feedback for CoMPF', R1-120719, Feb. 6-10, 2012, 3GPP TSG-RAN WG1 Meeting #68, Dresden, Germany.

ZTE, 'Evaluation of aggregated feedback for CoMP', R1-120299, Feb. 6-10, 2012, 3GPP TSG-RAN WG1 Meeting #68, Dresden, Germany.

LG Electronics, Evaluation results on CoMP with aggregated CQI or relative phase information, 3GPP TSG RAN WG1 Meeting #67, R1-113981, San Francisco, USA, Nov. 14, 2011.

Korean Office Action dated Jun. 10, 2019, issued in the Korean Application No. 10-2013-0035869.

* cited by examiner

- PDSCH
- DM-RS for ports 7, 8, 11, 13
- DM-RS for ports 9, 10, 12, 14
- CRS
- Control Channel

CHANNEL STATE INFORMATION TRANSMISSION/RECEPTION METHOD AND APPARATUS OF DOWNLINK COORDINATED MULTI-POINT COMMUNICATION SYSTEM

CROSS-REFERENCE TO RELATED APPLICATIONS

This application is a continuation application of prior application Ser. No. 13/856,134, filed on Apr. 3, 2013, and claims the benefit under 35 U.S.C. § 119(e) of a U.S. provisional application filed on Apr. 6, 2012 in the U.S. Patent and Trademark Office and assigned Ser. No. 61/621,168, and under 35 U.S.C. § 119(a) of a Korean patent application filed on Apr. 2, 2013 in the Korean Intellectual Property Office and assigned Serial No. 10-2013-0035869, the entire disclosure of each of which is hereby incorporated by reference.

BACKGROUND OF THE INVENTION

1. Field of the Invention

The present invention relates to a method and an apparatus for transmitting/receiving Channel State Information (CSI) in a Coordinated Multi-Point (COMP) communication system.

2. Description of the Related Art

A communication system has uplink and downlink channels. The downlink channels are established for transmission from at least one Transmission Point (TP) to User Equipments (UEs). The uplink channels are established for transmission from the UEs to at least one Reception Point (RP). The UE is typically referred to as a terminal or a mobile station. The UE can be a fixed UE or a mobile UE. The UE can be any one of a radio device, a cellular phone, a personal computer device, and the like. The TP or RP is typically a fixed station. The TP and RP can be integrated into a single device which can be referred to as base station. The base station can be referred to as any one of a Base Transceiver System (BTS), a Node B, an enhanced Node B (eNB), an Access Point (AP), and the like.

The communication system supports transmission of diverse signals including a data signal, a control signal, and a reference signal. The data signal carries information content. The control signal is capable of processing the data signal appropriately. The reference signal can also be referred to as a pilot signal. The reference signal is capable of coherent demodulation on the data and control signals. The reference signal makes it possible to generate the Channel State Information (CSI) corresponding to the estimation value of the channel medium.

The Uplink (UL) data is carried by a Physical Uplink Shared Channel (PUSCH). The UE transmits a PUSCH, and the UL Control Information (UCI) is transmitted through Physical Uplink Control Information (PUCCH) with the exception of the case where the UE is capable of transmitting the data and a part of UCI through the PUSCH. The UCI includes acknowledgement (ACK) information in association with a Hybrid Automatic Repeat Request (HARQ) process. The HARQ-ACK is of acknowledging the receipt of the Transport Blocks (TB) transmitted to the UE in downlink of the communication system and corresponds to the signal transmitted from the Node B to the UE.

The DL TBs are transmitted on a Physical Downlink Shared Channel (PDSCH). The UCI may include at least one of a Channel Quality Indicator (CQI), a Precoding Matrix Indicator (PMI), and a Rank Indicator (RI). The CQI, PMI, and RI can be integrally referred to as Channel State Information (CSI). The CQI provides the Node B with the Signal to Interference and Noise Ratio (SINR) which the UE experiences across sub-bands or entire DL operating bandwidth (BW). Typically, the measurement value is provided in the form of the best Modulation and Coding Scheme (MCS) level at which a predefined BLock Error Rate (BLER) is accomplished. The Node B can be notified of the method of combining the signals transmitted from the UE to the Node B antennas in a Multiple-Input Multiple-Output (MIMO) scheme with PMI/RI. The UE is capable of transmitting the UCI on PUCCH in separation from data or PUSCH along with data.

The DL data is transmitted on PDSCH. The DL Control Information (DCI) includes at least one of a DL CSI feedback request, a UL Scheduling Assignments for PUSCH transmission (UL SAs), and a DL Scheduling Assignments for PDSCH reception (DL SAs). The SAs are notified by the DCI formats transmitted on a Physical Downlink Control Channel (PDCCH). In addition to SAs, the PDCCHs may carry a common DCI for all UEs or a group of UEs.

FIG. 1 is a graph illustrating a resource for use in a Long Term Evolution-Advanced (LTE-A) system according to the related art.

Referring to FIG. 1, in the LTE and LTE-A, the DL transmission is performed in a unit of a time-domain subframe and a frequency-domain Resource Block (RB). A subframe spans 1 msec, and an RB consists of 12 subcarriers corresponding to the transmission bandwidth of 180 kHz. As shown in FIG. 1, the system bandwidth of LTE-A is divided into plural RBs in the frequency domain and plural subframes in the time domain.

The LTE-A Release 10 and beyond systems may operate with different signals. In downlink, the following reference signals are transmitted.

1. A Cell Specific Reference Signal (CRS): Used in an initial system access, paging, a PDSCH demodulation, a channel measurement, a handover, and the like.

2. A Demodulation Reference Signal (DMRS): used for demodulation of a PDSCH.

3. A Channel Status Information Reference Signal (CSI-RS): Used for channel measurement.

In addition to these reference signals, zero-power CSI-RS can be adopted to the LTE-A release 10. Although the zero power CSI-RS may occur at the same time and frequency resources as the normal CSI-RS, it differs from the normal CSI-RS in that the REs to which the zero power CSI-RS are mapped have no transmission. The zero power CSI-RS aims at muting CSI-RS transmission of a specific TP on the resource used by the adjacent TPs so as to avoid interference to the CSI-RSs transmitted by the adjacent TPs.

FIG. 2 is a diagram illustrating an RB for use in an LTE/LTE-A system according to the related art.

Referring to FIG. 2, the RB consists of Resource Elements (REs) to which diverse reference signals, PDSCH, zero power CSI-RS and control channels are mapped. It is noted that FIG. 2 shows a single RB in the frequency domain and a single subframe in the time domain. A subframe may include a plurality of RBs that can be used for transmitting the aforementioned signals. In FIG. 2, the resources marked with A, B, C, D, E, F, G, H, I, and J correspond to 4 CSI-RS ports. For example, the 4 REs marked with 'A' are used for CSI-RS transmission with 4 antenna ports. The CSI-RS of 2 antenna ports can be transmitted on the resource acquired by restricting the resource for CSI-RS of 4 antenna ports to 2. Additionally, the CSI-RS of 8 antenna ports can be transmitted on the resource acquired by combining the two resources for CSI-RS of the 4 antenna ports. The zero power CSI-RS can be mapped to the resources for CSI-RS of 4 antenna ports.

In the DL transmission mode 9 of the 3rd Generation Partnership Project (3GPP) LTE-A release 10, the UEs measures the CSI-RS transmitted by the eNB and feeds back downlink Channel Status Information (CSI), such as RI, PMI, and CQI. The RI, PMI, and CQI are reported at the respective timings indicated by the eNB. In a CSI feedback, PMI is calculated based on the most recently reported RI while CQI is calculated under the assumption of the most recently reported RI and PMI.

Meanwhile, one of the key issues in the communication systems is the enhancement of a cell area and system throughput. The Coordinated Multi-Point (CoMP) transmission/reception is one of the significant techniques to accomplish these aims. The CoMP relies on the fact that the UE located at the cell edge is capable of receiving the downlink signal transmitted via a set of TPs more reliability (DL CoMP) and transmitting the uplink signal via a set of RPs more reliably (UL CoMP). The DL CoMP may include the relatively simple interference avoidance methods, such as a coordinated scheduling and complex methods requiring accurate and detailed channel information, such as a coordinated transmission of plural TPs. The UL CoMP may include the simple methods, such as a PUSCH scheduling in consideration of a single RP and more complex methods based on the received signal characteristics from multiple RPs and in consideration of interference.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide an improved Channel State Information (CSI) feedback method and an apparatus that is capable of transmitting CSI efficiently in the Coordinated Multi-Point (CoMP) system.

In accordance with an aspect of the present invention, a CSI transmission method of a terminal for receiving Joint Transmission (JT) from a first Transmission Point (TP) and a second TP is provided. The method includes receiving a first CSI Reference Signal (CSI-RS) corresponding to the first TP, receiving a second CSI-RS corresponding to the second TP, generating an aggregated CSI corresponding to the first and second CSI-RSs, and transmitting the aggregated CSI, wherein the generating of the aggregated CSI comprises creating the aggregated CSI with a transmission timing of the aggregated CSI.

In accordance with another aspect of the present invention, a terminal for receiving JT from a first TP and a second TP is provided. The terminal includes a transceiver which transmits a first CSI-RS corresponding to the first TP and a second CSI-RS corresponding to the second TP, and a controller which generates an aggregated CSI corresponding to the first and second CSI-RSs, wherein the transceiver transmits the aggregated CSI, and the controller generates the aggregated CSI-RS with a transmission timing of the aggregated CSI.

In accordance with another aspect of the present invention, a CSI reception method of a higher layer device is provided. The method includes transmitting a first CSI-RS, receiving an aggregated CSI including an aggregated Channel Quality Indicator (CQI) from a terminal, acquiring a phase difference value based on reception timing of the aggregated CSI, and scheduling the terminal based on the aggregated CQI and the phase difference.

In accordance with another aspect of the present invention, a higher layer device for receiving CSI is provided. The device includes a transceiver which transmits a first CSI-RS and receives an aggregated CSI including an aggregated CQI from a terminal, and a controller which acquires a phase difference value based on reception timing of the aggregated CSI and schedules the terminal based on the aggregated CQI and the phase difference.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
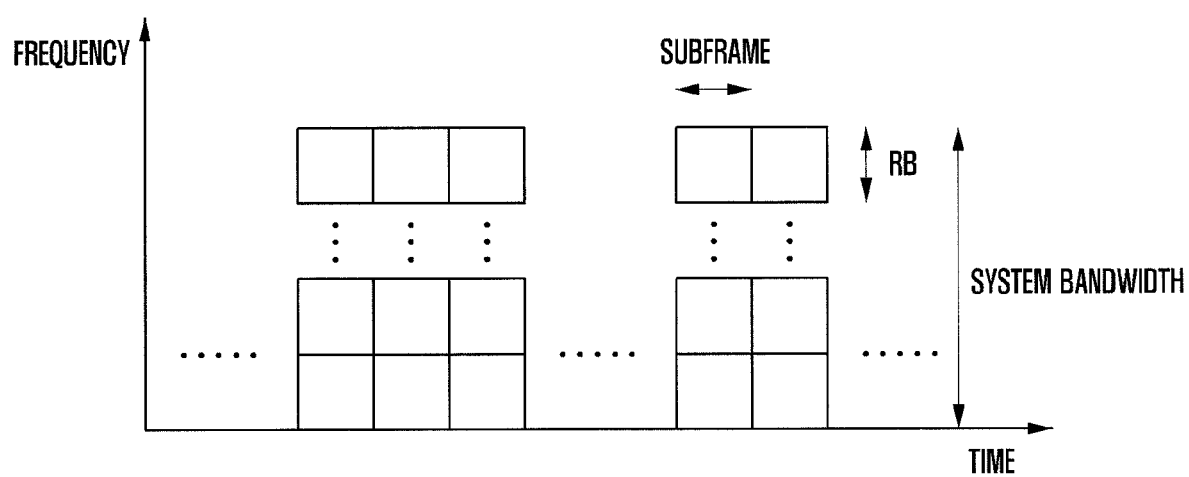
FIG. 1 is a graph illustrating a resource for use in a Long Term Evolution-Advanced (LTE-A) system according to the related art.
Figure 2:
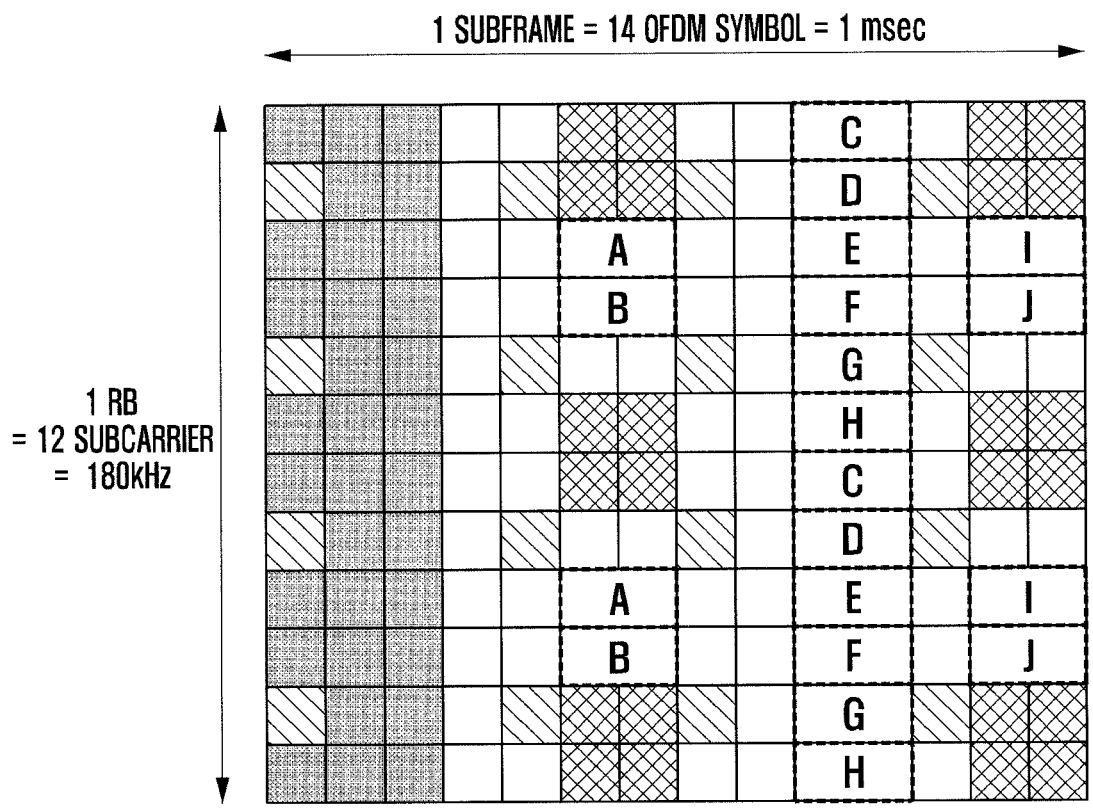
FIG. 2 is a diagram illustrating a Resource Block (RB) for use in an LTE/LTE-A system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

There is a need of introducing a new Channel State Information (CSI) feedback for diverse Coordinated Multi-Point (CoMP) schemes for facilitating DownLink (DL) CoMP in the Long Term Evolution-Advanced (LTE-A) system. The CSI feedback method of the related art is performed in consideration of a single Transmission Point (TP) and a single CSI-Reference Signal (CSI-RS) for channel measurement and CSI feedback. Accordingly, it is difficult to apply the CSI feedback scheme of the related art to the CoMP system supporting multiple TPs transmission with multiple CSI-RS without modification. There is therefore a need of a new CSI feedback scheme for supporting multiple TPs transmission (or CSI feedback for corresponding CSI-RS configurations). The feedback mechanisms for the CoMP schemes can be summarized as following:

1. The CSI reports for multiple TPs can be characterized by one of following 1-1 to 1-4.
    1-1. The enhanced Node B (eNB) allocates multiple CSI-RS resources to a User Equipment (UE) for CSI report.
    1-2. Each CSI-RS resource is used for the UE to measure DL channel from a specific TP.
        1-2-1. According to an exemplary embodiment of the present invention, a single CSI-RS corresponding to multiple TPs is not ruled out.
    1-3. A set of CSI-RS resources (or corresponding TPs) allocated to the UE for CSI report is referred to as "CoMP measurement set".
    1-4. The eNB is capable of designating the transmission mode and timing per feedback corresponding to each CSI-RS.
2. An additional feedback for a Dynamic TP Selection and a Dynamic Blanking (DS/DB) can be applied. In this case, the system can be characterized by one of the following 2-1 and 2-2.
    2-1. Some TPs (e.g., macro Node Bs) are capable of muting data transmission (e.g., performing zero power transmission) to help DL data reception of the UEs attached to other TPs.
    2-2. If specific TPs turn on and off the data transmission (e.g., zero power transmission), the UE is capable of performing additional feedback reflecting interference situation.
3. An additional feedback for Joint Transmission (JT) can be applied. The JT can be characterized by at least one of the following 3-1 and 3-2.
    3-1. Multiple TPs are capable of transmitting data to a UE simultaneously.
    3-2. In order for multiple TPs to perform JT, it is imperative for the UE to perform additional feedback reflecting the JT situation.

Figure 3:
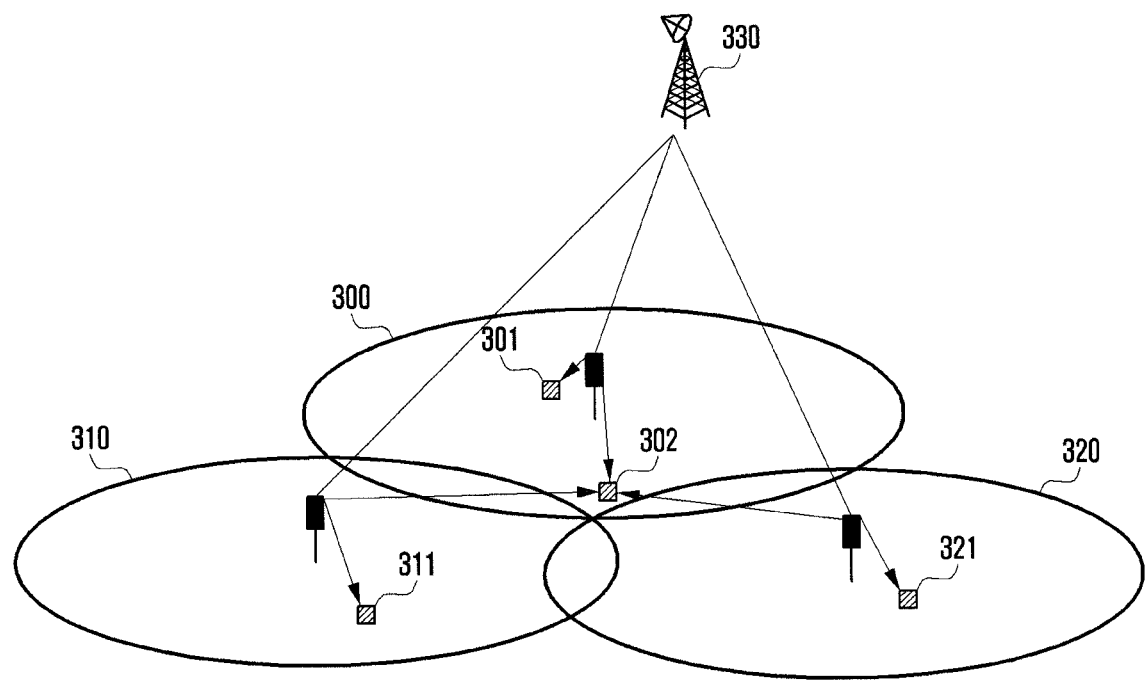
FIG. 3 is a diagram illustrating an architecture of a mobile communication system capable of a Coordinated Multi-Point (CoMP) communication according to an exemplary embodiment of the present invention.

FIG. 3 is a diagram illustrating an architecture of a mobile communication system capable of a CoMP communication according to an exemplary embodiment of the present invention. FIG. 3 is directed to an exemplary case of the cellular mobile communication system including three cells. In the following description, the term 'cell' denotes the data transmission area served by a specific TP, and each TP can be a Remote Radio Head (RRH) using the same cell IDentifier (ID) as the macro eNB. In addition, the TPs can be macro and/or pico cells using different cell IDs.

A central controller 330 transmits and receives that to and from UEs 301, 302, 311, and 321 and processes the data received and to be transmitted. Here, in the case that the TPs are the RRHs using the same cell ID as the macro eNB, the macro eNB can be referred to as central controller. In the case that the TPs are the macro and/or pico cells using different cell IDs, a device managing the cells integrally can be referred to as central controller.

Referring to FIG. 3, the cellular mobile communication system includes at least one cell 300, 310, and 330 and UEs 301, 311, and 321 receiving data from the closest cells, and the UE 302 received data from the cells 300, 310, and 320 through a CoMP transmission. The UEs 301, 311, and 321 receiving data from the closest cell estimates channels using the CSI-RS of their serving cells and feed back to the central controller 330. However, the UE 302 receiving the data from the three cells 300, 310, and 320 in CoMP transmission mode has to estimate all the channels form the three cells 300, 310, and 320. For the channel estimation of the UE 302, the central controller 330 allocates three CSI-RS resources corresponding to the cells 300, 310, and 320. How the central controller 330 allocates CSI-RS resources to the UE 302 is described hereinafter with reference to FIG. 4.

Figure 4:
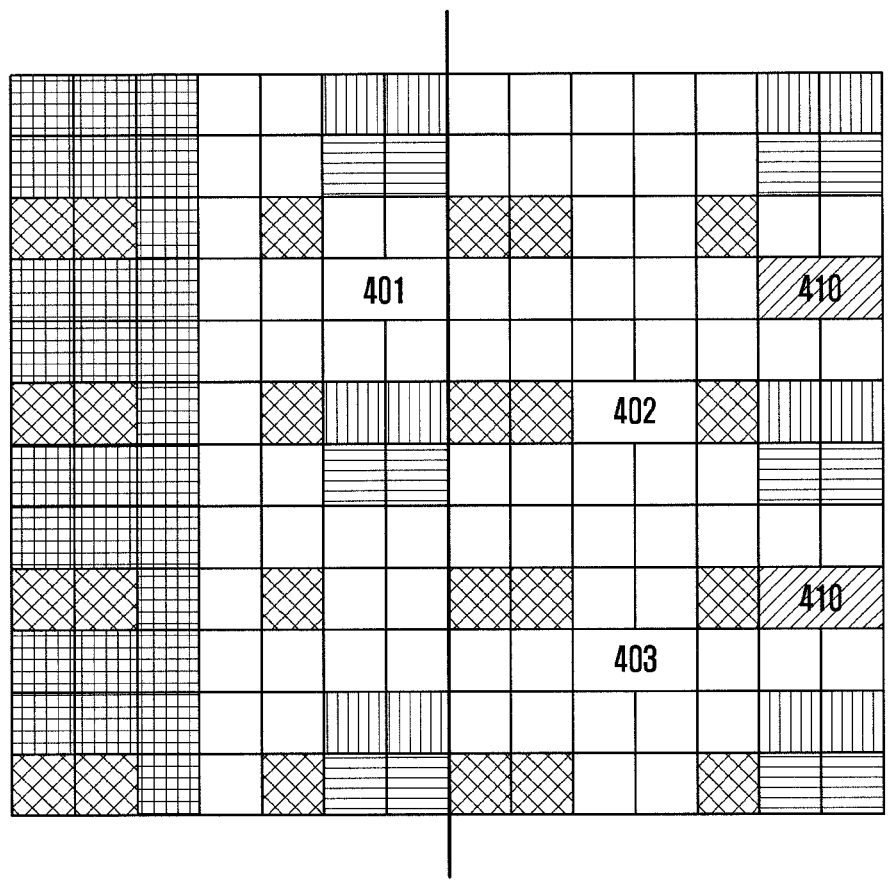
FIG. 4 is a diagram illustrating a Channel Status Information Reference Signal (CSI-RS) resource allocation pattern for use in a CoMP communication according to an exemplary embodiment of the present invention.

FIG. 4 is a diagram illustrating a CSI-RS resource allocation pattern for use in a CoMP communication according to an exemplary embodiment of the present invention.

Referring to FIG. 4, the central controller 330 maps three CSI-RSs to the sources 401, 402, and 403 for the UE 302 in CoMP mode to estimate the channels from the cells 300, 310, and 320 and the channel for receiving control information and system information and transmits the CSI-RSs on the corresponding resources. For example, the CSI-RS for channel estimation of the cell 300 is mapped to the resource position 401, the CSI-RS for channel estimation of the cell 310 to the resource position 402, and the CSI-RS for channel estimation of the cell 320 to the resource position 403. As described above, a set of resource including at least one resource allocated to the UE in CoMP mode for CSI-RS transmission or a set of the cells corresponding to the CSI-RS resources is referred to as CoMP measurement set.

In order to support a DS/DB technique, the central controller 330 is capable of allocating to the UE 302 additional resource for use in interference measurement. The data amount the UE 302 can receive per unit time is determined depending on the interference amount as well as the signal strength. Accordingly, the central controller 330 may allocate the Interference Measurement Resource (IMR) for the UE to measure the interference accurately. The eNB is capable of allocating to the UE 302 a common IMR in order for the UE 302 to measure the interference amount to the signal components for all CSI-RSs in the measurement set or several IMRs in order for the UE to measure the interferences for the zero power transmission situation and normal transmission situation. Referring to FIG. 4, the UE 302 measures the signals from the three cells 301, 311, and 321 using the three CSI-RS resources 401, 402, and 403. The UE 302 is capable of measuring the interference occurring when it receives the signals from the three cells using the IMR resource 410. At this time, the eNB or the central controller 330 is capable of controlling the signal transmission of the neighbor cells at the resource position 410 in order to reflect the interference to the UE 302 accurately. The CSI report for CoMP can be transmitted on a Physical Uplink Control Information (PUCCH) in separation of the data or on a Physical Uplink Shared Channel (PUSCH) along with data. Accordingly, it is imperative that the CSI report is performed for CoMP on PUSCH and PUCCH, respectively.

As described above, the default feedback mode for multiple CSI-RS may be Per-CSI-RS-resource feedback for reporting individual channel states for the respective CSI-RS resources. The UEs perform measurements on the respective CSI-RS resources for plural TPS to generate and feed back CSI. In the case of per-CSI-RS-resource feedback, the CSI is transmitted individually for some or all of the CSI-RS resources. For example, assuming the CoMP measurement set of {CSI-RS-1, CSI-RS-2}, the central controller sends the UE the Radio Resource Control (RRC) information to instruct to generate the CSI-RS feedbacks for the two individual feedback configurations. An example is provided below.

Exemplary Embodiment 1

1. UE's first feedback configuration: (Mode 1-1, $N_{pd}$=10, $N_{OFFSET,CQI}$=0, $M_{RI}$=2, $N_{OFFSET,RI}$=−1, CSI-RS-1).
2. UE' second feedback configuration: (Mode 1-1, $N_{pd}$=10, $N_{OFFSET,CQI}$=2, $M_{RI}$=2, $N_{OFFSET,RI}$=−1, CSI-RS-2).

In Exemplary Embodiment 1, mode 1-1 means that the corresponding CSI feedback includes a Rank Indicator (RI) and a wideband CQI/Precoding Matrix Indicator (PMI). The wideband CQI/PMI report timing is the subframes fulfilling $(10 \times n_f + \text{floor}(n_s/2) - N_{OFFSET,CQI}) \bmod N_{pd} = 0$. Here, $n_f$ denotes the system frame number, and $n_s = \{0, 1, \ldots, 19\}$ denotes the slot indices in the frame. $N_{OFFSET,CQI}$ denotes the wideband CQI/PMI report offset (in a unit of a subframe), and $N_{pd}$ denotes the wideband CQI/PMI period (in a unit of a subframe). The RI report interval is an integer multiple (multiple of MO of the wideband CQI/PMI period $N_{pd}$ (in a unit of a subframe). Moreover, floor(x) denotes the function for returning maximum integer equal to less than x. For example, the RI report instances are the subframes fulfilling $(10 \times n_f + \text{floor}(n_s/2) - N_{OFFSET,CQI}) \bmod (N_{pd} \times M_{RI}) = 0$. The RI report offset $N_{OFFSET,RI}$ is taken from the set $\{0, -1, \ldots, |(N_P - 1)|\}$. In the case that the RI and the wideband CQI/PMI collide, the wideband CQI/PMI drops.

Figure 5:
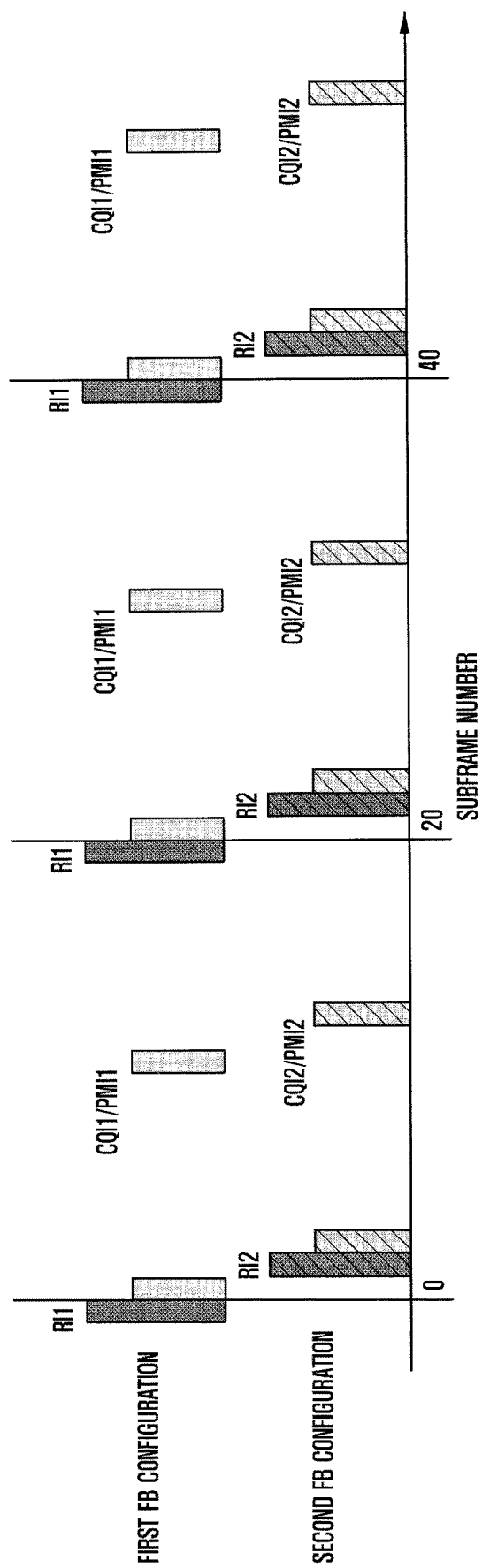
FIG. 5 is a diagram illustrating CSI feedback timings for two CSI-RS resources in a Channel Quality Indicator (CQI) transmission method according to a first exemplary embodiment of the present invention.

FIG. 5 is a diagram illustrating CSI feedback timings for two CSI-RS resources in a CQI transmission method according to the first exemplary embodiment of the present invention. The feedbacks for two different CSI-RSs are performed at the respective timings independently.

Referring to FIG. 5, in consideration of JT, an additional CSI for common transmission from the TPs can be used in addition to the Per-CSI-RS-resource feedback. For example, in the case that the CSI-RS resources allocated to the UE include the CSI-RS resources for plural TPs, the UE is capable of performing additional report of the CSI for the set of CSI-RS resources, such as aggregated CQI for the situation where the phase differences among the TPs and/or JT are applied.

Suppose that the CoMP measurement set of the UE corresponding to TP-1 and TP-2 having $N_1$ and $N_2$ antenna ports, respectively, is {CSI-RS-1, CSI-RS-2} and the individual CSIs determined for the two CSI-RSs are characterized by following sections 1 to 3:

1. CQI determined for TP-1 is CQI-1 and CQI determined for TP-2 is CQI-2.
2. Rank is determined as r for both TP-1 and TP-2.
3. Precoding matrices for TP-1 and TP-2 are $P_1$ and $P_2$.

Here, $P_1$ and $P_2$ have the size of $N_1 \times r$ and $N_2 \times r$, respectively, and the respective PMIs are determined as the values corresponding to $P_1$ and $P_2$. If the additional feedback for JT is considered, the UE has to generate and report the aggregated CQI indicating the channel state in the JT situation where the TP-1 and TP-2 transmit data simultaneously. For example, the aggregated CQI for the JP situation of TP-1 and TP-2 can be generated under the assumption that the rank in the JT situation is equal to the common rank value r determined for the individual TP and the precoding matrix with a size of $(N_1+N_2) \times r$ for JT situation is given as $$P_{JT}(\theta) = \begin{bmatrix} P_1 \\ \theta \cdot P_2 \end{bmatrix}.$$

Here, $\theta$ denotes one of the elements of the unit complex conjugate set $$\{e^{j2\pi \frac{0}{M}}, e^{j2\pi \frac{1}{M}}, e^{j2\pi \frac{2}{M}}, \ldots, e^{j2\pi \frac{M-1}{M}}\}$$

having size M. $\theta$ reflects the phase difference between two TPs participated in JT. Here, it can be a problem to determine which TP is referenced for calculating the phase $\theta$. For example, the eNB is capable of notifying the UE of the information indicating the reference point for calculating the phase $\theta$. The eNB is capable of notifying the UE of a feedback index for specific CSI-RS corresponding to the reference point or the index of CSI-RS (or TP). In this case, an RRC signaling or a Physical Downlink Control Channel (PDCCH) can be used. In a modified example, the eNB is capable of taking into consideration of the phase differences of other TPs based on the feedback or CSI-RS (or TP) with the least index. In the above example, $\theta$ configured based on the TP-1 as reference point is the value indicating the phase difference of TP-2 to TP-1. In this case, the UE generates the aggregated CQI under the assumption of the phase difference of 0 and precoding matrix of $$P_{JT}(\theta) = \begin{bmatrix} P_1 \\ \theta \cdot P_2 \end{bmatrix}.$$

Here, a method for determining θ as the value reflecting the phase difference between TPs is considered in the situation where the UE generates a specific aggregated CQI and performs CQI feedback. In this exemplary embodiment, the UE determines the θ value for calculating the aggregated CQI in consideration of at least one of the two following factors:

1. aggregated CQI feedback time (timing),
2. frequency region corresponding to aggregated CQI feedback.

Table 1 shows an exemplary phase difference θ between TPs determined according to the feedback timing of the wideband aggregated CQI as CSI information for downlink frequency wideband used by the UE.

TABLE 1

| Feedback timing | $1^{st}$ report | $2^{nd}$ report | $3^{rd}$ report | ... | $M^{th}$ report | $(M+1)^{th}$ report | ... |
|---|---|---|---|---|---|---|---|
| Phase difference θ between TPs | $e^{j2\pi\frac{s_1}{M}}$ | $e^{j2\pi\frac{s_1+1}{M}}$ | $e^{j2\pi\frac{s_1+2}{M}}$ | ... | $e^{j2\pi\frac{s_1+M-1}{M}}$ | $e^{j2\pi\frac{s_1}{M}}$ | ... |

In the exemplary method for determining θ based on Table 1, when reporting $i^{th}$ wideband aggregated CQI, the UE generates the wideband aggregated CQI under the assumption that θ is the $(s_1+i \bmod M)^{th}$ element of the set $$\left\{ e^{j2\pi\frac{0}{M}}, e^{j2\pi\frac{1}{M}}, e^{j2\pi\frac{2}{M}}, \ldots, e^{j2\pi\frac{M-1}{M}} \right\}$$

of M values. In this exemplary embodiment, θ is determined in a periodic method predefined according to the report timing. Here, the start value Si of θ can be 0, 1, or other fixed value or configured by the eNB to the UE through RRC signaling. In addition, M can be a fixed value known to the UE/eNB or a value notified from the eNB to the UE through RRC signaling or other method.

In the above exemplary embodiment, the first report is not limited to the initial report after the UE's attachment to the eNB but can be a certain time point determined randomly. Similarly, a randomly determined time point can be the first report timing in other exemplary embodiments of the present invention.

In the exemplary method for determining θ according to another modified exemplary embodiment, the UE generates the wideband aggregated CQI under the assumption that θ is the $f(s_1+i)^{th}$ element of the set $$\left\{ e^{j2\pi\frac{0}{M}}, e^{j2\pi\frac{1}{M}}, e^{j2\pi\frac{2}{M}}, \ldots, e^{j2\pi\frac{M-1}{M}} \right\}$$

of M values available for θ. Here, f(x) is a pseudo-random sequence or corresponding function value outputting an integer value greater than 0 and less than M−1. f(x) also can be another type of function outputting an integer greater than 0 and less than M−1. The exemplary embodiment based on Table 1 is directed to an example in the case of $f(x)=(s_1+x \bmod M)$. The eNB and the UE share the same information needed for calculating f(x). For example, in the corresponding exemplary method, the start value Si can be 0, 1, or other fixed value or configured by the eNB to the UE through an RRC signaling. In addition, M can be a fixed value known to the UE/eNB or a value notified from the eNB to the UE through RRC signaling or other method.

Table 2 shows an example of the method for determining the phase difference θ between TPs according to the sub-band index and feedback timing of the sub-band aggregated CQI in a situation where the downlink frequency band for the UE is divided into sub-bands of which CSI information are reported respectively.

TABLE 2

|  | $1^{st}$ report | $2^{nd}$ report | $3^{rd}$ report | ... | $M^{th}$ report | $(M+1)^{th}$ report | ... |
|---|---|---|---|---|---|---|---|
| Subband 1 | $e^{j2\pi\frac{s_1}{M}}$ | $e^{j2\pi\frac{s_1+1}{M}}$ | $e^{j2\pi\frac{s_1+2}{M}}$ | ... | $e^{j2\pi\frac{s_1+M-1}{M}}$ | $e^{j2\pi\frac{s_1}{M}}$ | ... |
| Subband 2 | $e^{j2\pi\frac{s_2}{M}}$ | $e^{j2\pi\frac{s_2+1}{M}}$ | $e^{j2\pi\frac{s_2+2}{M}}$ | ... | $e^{j2\pi\frac{s_2+M-1}{M}}$ | $e^{j2\pi\frac{s_2}{M}}$ | ... |
| Subband 3 | $e^{j2\pi\frac{s_3}{M}}$ | $e^{j2\pi\frac{s_3+1}{M}}$ | $e^{j2\pi\frac{s_3+2}{M}}$ | ... | $e^{j2\pi\frac{s_3+M-1}{M}}$ | $e^{j2\pi\frac{s_3}{M}}$ | ... |
| ⋮ | ⋮ | ⋮ | ⋮ | ⋮ | ⋮ | ⋮ | ⋮ |
| Subband L | $e^{j2\pi\frac{s_L}{M}}$ | $e^{j2\pi\frac{s_L+1}{M}}$ | $e^{j2\pi\frac{s_L+2}{M}}$ | ... | $e^{j2\pi\frac{s_L+M-1}{M}}$ | $e^{j2\pi\frac{s_L}{M}}$ | ... |

In the exemplary method based on Table 2, when reporting the $i^{th}$ aggregated CQI for the $l^{th}$ sub-band, the UE generates the wideband aggregated CQI under the assumption that θ is the $(s_1+i \bmod M)^{th}$ element of the set $$\left\{ e^{j2\pi\frac{0}{M}}, e^{j2\pi\frac{1}{M}}, e^{j2\pi\frac{2}{M}}, ..., e^{j2\pi\frac{M-1}{M}} \right\}$$

of M values available for θ. In this exemplary embodiment, the value θ is determined in a periodic method predefined according to the report timing and sub-band index. Here, the start values $s_1, s_2, \ldots, s_L$ (i.e., first row of Table 2) of θ for the respective sub-bands can be 0, 1, or other fixed value or configured by the eNB to the UE through an RRC signaling. In a modified exemplary embodiment, the start values $s_1, s_2, \ldots, s_L$ can be set to different values as following methods:

Exemplary Method 1: $s_l=(l-1)$, l=1, 2, . . . , L,

Exemplary Method 2:

$$s_l = \left\lfloor \frac{M}{L} \right\rfloor \cdot (l-1), l = 1, 2, ..., L.$$

According to a modified exemplary embodiment, the eNB is capable of notifying the UE of the start values $s_1, s_2, \ldots, s_L$ through an RRC signaling or other communication method.

According to another modified exemplary embodiment, when reporting aggregated CQI for $l^{th}$ sub-band, the UE generates the sub-band aggregated CQI under the assumption that θ is the $f(s_1+i)^{th}$ element of the set $$\left\{ e^{j2\pi\frac{0}{M}}, e^{j2\pi\frac{1}{M}}, e^{j2\pi\frac{2}{M}}, ..., e^{j2\pi\frac{M-1}{M}} \right\}$$

of M values. Here, f(x) is a pseudo-random sequence or corresponding function value outputting a value greater than 0 and less than M-1. f(x) also can be another type of function outputting an integer greater than 0 and less than M-1. The exemplary embodiment based on Table 2 is directed to an example in the case of $f(x)=(s_1+x \mod M)$. The eNB and the UE share the same information needed for calculating f(x). In this case, the start values $s_1, s_2, \ldots, s_L$ can be 0, 1, or other fixed value or configured by the eNB to the UE through RRC signaling. In addition, M can be a fixed value known to the UE/eNB or a value notified from the eNB to the UE through an RRC signaling or other method. L denotes a number of sub-band indices. According to another modified exemplary embodiment, the start values $s_1, s_2, \ldots, s_L$ can be set according to the following exemplary method 1 or exemplary method 2:

Exemplary Method 1: $s_l=(l-1)$, l=1, 2, . . . , L,

Exemplary Method 2:

$$s_l = \left\lfloor \frac{M}{L} \right\rfloor \cdot (l-1), l = 1, 2, ..., L.$$

According to a modified exemplary embodiment, the eNB is capable of notifying the UE of all the start values through an RRC signal or other communication method.

The above exemplary embodiment is proposed under the assumption that when the rank values of both the two TPs are r identically the precoding matrix for use in JT is determined as $$P_{JT}(\theta) = \begin{bmatrix} P_1 \\ \theta \cdot P_2 \end{bmatrix}.$$

However, exemplary embodiments of the present invention are not limited thereto. For example, an exemplary method for determining θ as the value reflecting the phase difference between TPs can be considered even in the situation where rank values for the two different TPs, i.e., TP-1 and TP-2, are determined as different values of $r_1$ and $r_2$.

Suppose that the CoMP measurement set of the UE corresponding to TP-1 and TP-2 having $N_1$ and $N_2$ antenna ports respectively is {CSI-RS-1, CSI-RS-2} and the individual CSIs determined for the two CSI-RSs are characterized by following sections 1 to 3 in consideration of the situation where the rank values of the TPs are determined as different values of $r_1$ and $r_2$:

1. CQI determined for TP-1 is CQI-1 and CQI determined for TP-2 is CQI-2.
2. Rank is determined as $r_1$ for TP-1 and $r_2$ for TP-2.
3. Precoding matrices for TP-1 and TP-2 are $P_1$ and $P_2$.

Here, $P_1$ and $P_2$ have the size of $N_1 \times r$ and $N_2 \times r$ respectively, and the respective PMIs are determined as the values corresponding to $P_1$ and $P_2$. If the aggregated CQI is considered as the additional feedback for JT, the aggregated CQI for the JT situation of TP-1 and TP-2 can be generated under the assumption that the maximum value among individual TPs $r_{JT}=\max(r_1,r_2)$ is the rank under the JT situation and the precoding matrix having the size of $(N_1+N_2) \times r_{JT}$ in JT situation is determined according to the exemplary method indicated by sections 1 and 2 described below.

1. If $r_1 > r_2$, the precoding matrix is assumed as $$P_{JT}(\theta) = \begin{bmatrix} P_1 \\ \theta \cdot [P_2, B_{N_2 \times (r_{JT}-r_2)}] \end{bmatrix} \text{ or } P_{JT}(\theta) = \begin{bmatrix} P_1 \\ \theta \cdot [B_{N_2 \times (r_{JT}-r_2)}, P_2] \end{bmatrix}.$$

2. If $r_1 < r_2$, the precoding matrix is assumed as $$P_{JT}(\theta) = \begin{bmatrix} [P_1, B_{N_1 \times (r_{JT}-r_1)}] \\ \theta \cdot P_2 \end{bmatrix} \text{ or } P_{JT}(\theta) = \begin{bmatrix} [B_{N_1 \times (r_{JT}-r_1)}, P_1] \\ \theta \cdot P_2 \end{bmatrix}.$$

Here, $B_{N \times r}$ is one of the following matrices:
1. N×r zero matrix.
2. Specific N×r precoding matrix defined in LTE standard.

Under the assumption of precoding matrix for JT, θ denotes the phase difference between TPs determined by feedback timing and/or sub-band index values according to the methods of above exemplary embodiments.

According to another exemplary embodiment, in the situation where the rank values of the TPs are determined as different value of $r_1$ and $r_2$, the aggregated CQI for the JT situation of TP-1 and TP-2 can be generated under the assumption that the rank in the JT situation is the minimum value among the ranks of the TPs $r_{JT}=\max(r_1,r_2)$ and the precoding matrix having the size of $(N_1+N_2) \times r_{JT}$ in the JT situation is determined by the following methods:

1. If $r_1 > r_2$, the precoding matrix is assumed as $$P_{JT}(\theta) = \begin{bmatrix} [P_1]_{N_1 \times r_2} \\ \theta \cdot P_2 \end{bmatrix}.$$

2. If $r_1 < r_2$, the precoding matrix is assumed as $$P_{JT}(\theta) = \begin{bmatrix} P_1 \\ \theta \cdot [P_2]_{N_2 \times r_1} \end{bmatrix}.$$

Here, $[P]_{N \times r}$ is an N×r matrix determined by selecting r columns among M columns of the matrix P having the size of N×M for M greater than r. Here, r columns are selected by a specific method shared between the eNB and the UE. Under the assumption of the precoding matrix for JT, θ denotes the phase different between TPs determined according to the feedback timing and/or sub-band index values through the methods of the above exemplary embodiments.

Figure 6:
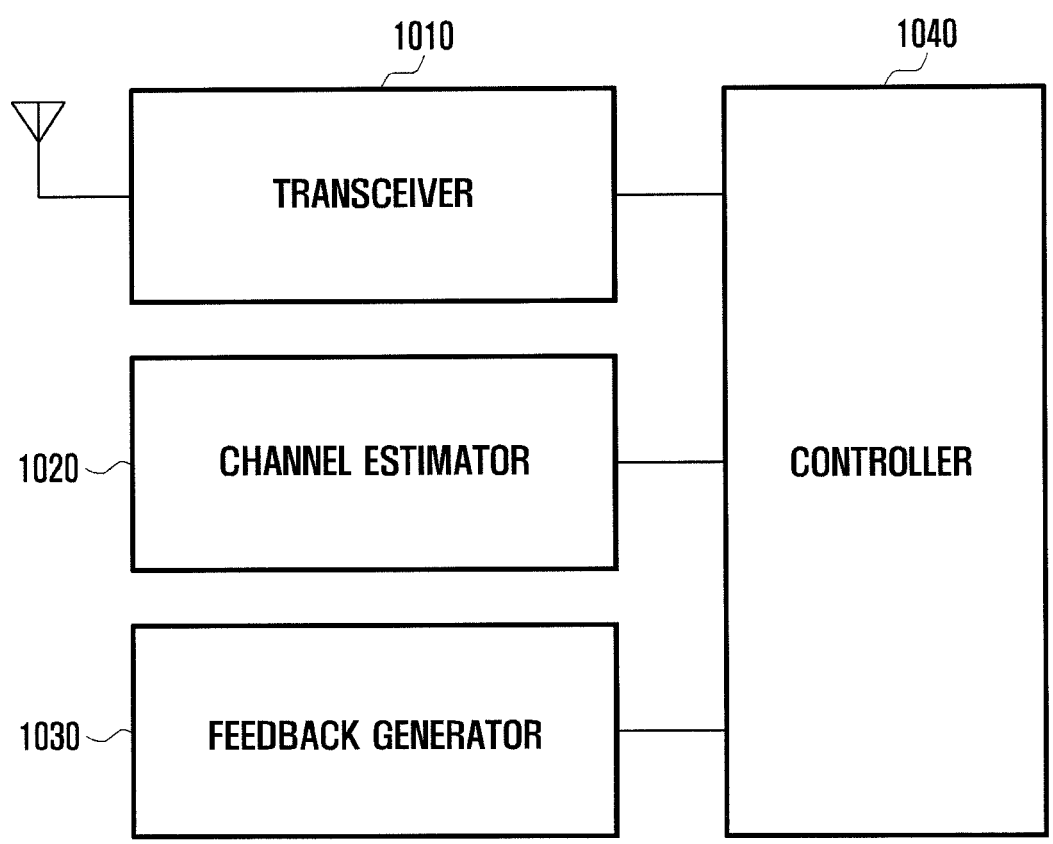
FIG. 6 is a block diagram illustrating a configuration of a User Equipment (UE) according to an exemplary embodiment of the present invention.

FIG. 6 is a block diagram illustrating a configuration of a UE according to an exemplary embodiment of the present invention.

Referring to FIG. 6, the UE includes a transceiver 1010, a channel estimator 1020, a feedback generator 1030, and a controller 1040. The transceiver 1010 transmits and receives control signals, data, and reference signals to and from the eNB. More particularly, in an exemplary embodiment of the present invention, the transceiver 1010 is capable of receiving CSI-RS and transmitting CSI feedback including the aggregated CQI for JT of the TPs. The channel estimator 1020 measures the CSI-RS ports allocated for the UE. The feedback generator 1030 generates individual CSI feedbacks for the plural TPs based on the measurement values of the channel estimator 1020 and the CSI feedbacks including the aggregated CQI in consideration of the phase differences among the TPS for JT. All the above operations are controlled by the controller 1040. The controller 1040 controls the internal components of the UE to transmit the aggregated CQI according to one of the above described exemplary embodiments of the present invention.

Figure 7:
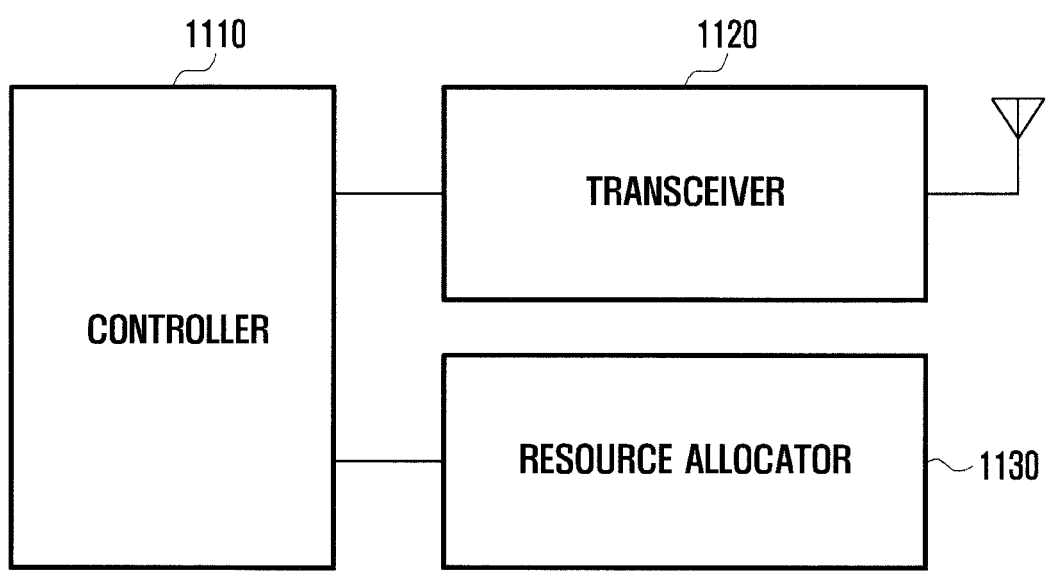
FIG. 7 is a block diagram illustrating a configuration of an enhanced Node B (eNB) according to an exemplary embodiment of the present invention.

FIG. 7 is a block diagram illustrating a configuration of an eNB according to an exemplary embodiment of the present invention.

Referring to FIG. 7, the eNB includes a controller 1110, a transceiver 1120, and a resource allocator 1130. The transceiver 1120 transmits and receives the control information, data, and reference signals with a UE. The transceiver 1120 transmits CSI-RS and receives CSI-RS feedback including the aggregated CQI acquired in consideration of the phase differences among the TP for JT. The resource allocator 1130 allocates CSI-RS resources and data resource to the UEs based on the CSI feedbacks from the UEs. All the above operations are controlled by the controller 1110. The controller 1110 controls the internal components of the eNB to transmit the CSI-RS and receive the aggregated CQI according to one of the above-described exemplary embodiments of the present invention.

Figure 8:
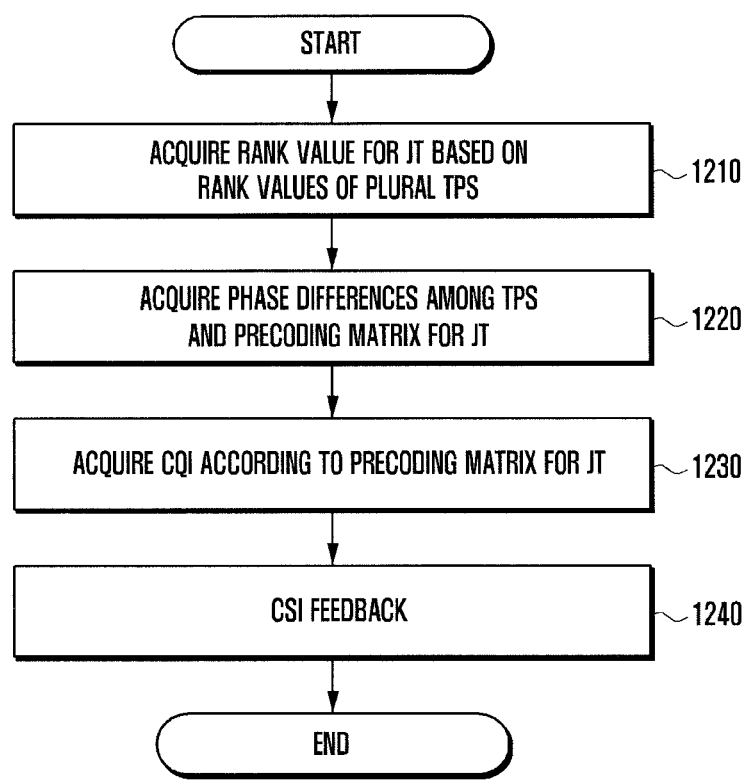
FIG. 8 is a flowchart illustrating a CSI feedback procedure of a UE according to an exemplary embodiment of the present invention.

FIG. 8 is a flowchart illustrating a CSI feedback procedure of a UE according to an exemplary embodiment of the present invention.

Referring to FIG. 8, the feedback generator 1030 determines the rank values of the plural TPs participated in the JT and determines the rank value for use in the JP at step 1210. The rank value is determined as described in the above exemplary embodiments. If it is configured to generate the rank values of all TPs as the same value, step 1210 may be omitted.

The feedback generator 1030 determines the phase differences among the TPs according to the method for calculating the phase differences based on the feedback timings of Table 1 or 2 and/or sub-band indices at step 1220. In accordance with the corresponding phase differences, the precoding matrix is determined. At step 1230, the feedback generator 1030 acquires the aggregated CQI under the assumption of using the precoding matrix which has been determined at step 1220.

The feedback generator 1030 generates a CSI including at least one of the acquired RI, PMI, and CQI and transmits the CSI by means of the transceiver 1010 at step 1240. According to an exemplary embodiment of the present invention, the RI and PMI for JT are partially excluded for generating the CSI. The CSI including the aggregated CQI is referred to as aggregated CSI. According to a modified exemplary embodiment, the aggregated CSI is capable of including the information on the aggregated PMI and/or aggregated RI acquired according to one of the above described exemplary embodiments.

Figure 9:
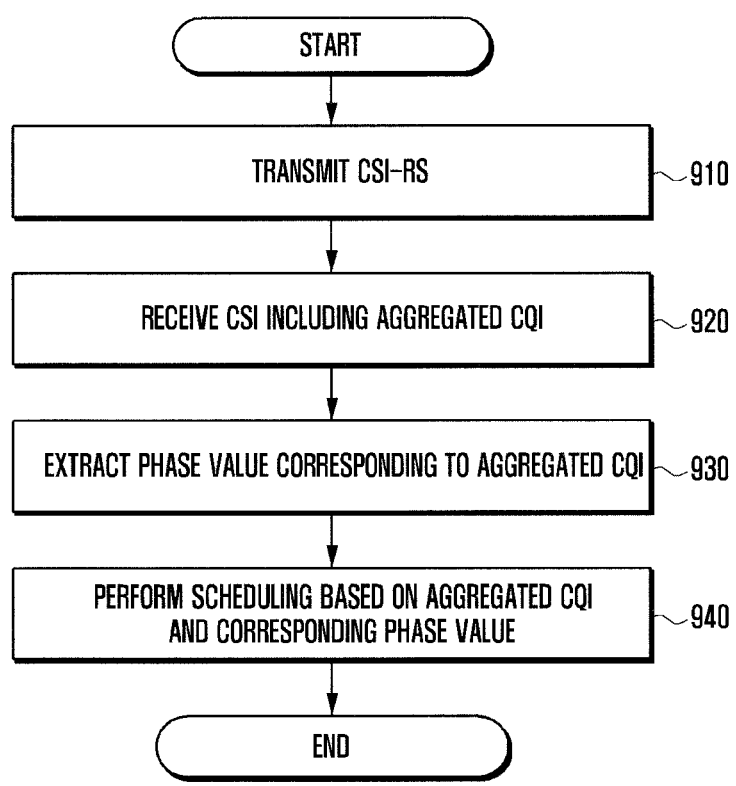
FIG. 9 is a flowchart illustrating a CSI reception procedure of an eNB (or a higher layer device) according to an exemplary embodiment of the present invention.

FIG. 9 is a flowchart illustrating a CSI reception procedure of an eNB (or higher layer device) according to an exemplary embodiment of the present invention.

Referring to FIG. 9, the transceiver 1120 of the eNB transmits CSI-RS to the UE at step 910. As described above, the CSI-RS resource position may be predefined by the resource allocator 1130.

The transceiver 1120 receives the CSI including the aggregated CQI from the UE at step 920. As described above, the aggregated CQI resource position may be predefined by the resource allocator 1130.

The controller 1110 extracts the phase value corresponding to the aggregated CQI at step 930. The controller 1110 extracts the phase value or phase value indicator corresponding to the aggregated CQI based on the CSI transmission timings and/or sub-band indices according to one of the above described exemplary embodiments.

The controller 1110 performs scheduling based on the aggregated CQI and the corresponding phase value at step 940. For example, the controller 1110 is capable of selecting the phase value (i.e., an optimal phase value) corresponding to the best CQI among the plural aggregated CQIs received currently and previously and scheduling the UE based on the selected phase value. The controller 1110 is also capable of determining the phase value to be applied to the corresponding UE in consideration of the phase value corresponding to the best CQI and scheduling the corresponding UE according to the determined phase value.

According to a modified exemplary embodiment, only the phase value selection can be performed by a higher layer device, e.g., a central controller, of the eNB. In this case, the eNB sends the aggregated CQI and the corresponding phase value (which may be replaced by information needed for calculating the other phase values) to the central controller 330 such that the central controller 330 selects the phase value based thereon and notifies the eNB of the selected phase value.

As described above, the CSI transmission/reception method and apparatus are capable of transmission CSI efficiently in the CoMP system.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagrams. These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagrams.

Furthermore, the respective block diagrams may illustrate parts of modules, segments or codes including at least one or more executable instructions for performing specific logic function(s). Moreover, it should be noted that the functions of the blocks may be performed in different order in several modifications. For example, two successive blocks may be performed substantially at the same time, or may be performed in a reverse order according to their functions.

The term "module" according to the exemplary embodiments of the present invention, means, but is not limited to, a software or hardware component, such as a Field Programmable Gate Array (FPGA) or an Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of a program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a terminal in a wireless communication system, the method comprising:
    receiving first configuration information associated with a first transmission point (TP) and second configuration information associated with a second TP;
    receiving a first channel state information-reference signal (CSI-RS) based on the first configuration information;
    receiving a second CSI-RS based on the second configuration information;
    identifying a subband for which an aggregated channel quality indicator (CQI) is obtained and a report timing of the aggregated CQI;
    determining a phase difference between the first TP and the second TP from a set of predetermined values, based on an index of the subband for which the aggregated CQI is obtained and the report timing of the aggregated CQI;
    obtaining the aggregated CQI based on a precoding matrix, the precoding matrix being applied with the phase difference between the first TP and the second TP;
    generating aggregated channel state information (CSI) based on the first CSI-RS and the second CSI-RS, the aggregated CSI including the aggregated CQI; and
    transmitting the aggregated CSI,
    wherein, in case that a first rank of the first TP and a second rank of the second TP are different, a smaller rank between the first rank and the second rank is used for obtaining the aggregated CQI.

2. The method of claim 1,
    wherein the generating of the aggregated CSI further comprises determining a precoding matrix indicator (PMI) by using the phase difference, the first CSI-RS and the second CSI-RS, and
    wherein the aggregated CSI further comprises the PMI.

3. A method of a first transmission point (TP) in a wireless communication system, the method comprising:
    transmitting, to a terminal, first configuration information associated with the first TP;
    transmitting, to the terminal, a first channel state information reference signal (CSI-RS) based on the first configuration information; and
    receiving, from the terminal, aggregated channel state information (CSI) based on the first CSI-RS and a second CSI-RS associated with a second TP, the aggregated CSI including an aggregated channel quality indicator (CQI),
    wherein a subband for which the aggregated CQI is obtained and a report timing of the aggregated CQI are identified by the terminal,
    wherein a phase difference between the first TP and the second TP is determined from a set of predetermined values by the terminal, based on an index of the subband for which the aggregated CQI is obtained and the report timing of the aggregated CQI,
    wherein the aggregated CQI is obtained based on a precoding matrix, the precoding matrix being applied with the phase difference between the first TP and a second TP, and
    wherein, in case that a first rank of the first TP and a second rank of the second TP are different, a smaller rank between the first rank and the second rank is used for obtaining the aggregated CQI.

4. The method of claim 3, further comprising:
    acquiring the phase difference based on the index of the subband and a reception timing of the aggregated CSI; and
    scheduling the terminal based on the aggregated CQI and the phase difference.

5. The method of claim 4,
    wherein the scheduling of the terminal comprises selecting a phase difference for scheduling the terminal, and
    wherein the phase difference for scheduling the terminal corresponds to a predetermined CQI among at least one aggregated CQIs.

6. A terminal in a wireless communication system, the terminal comprising:
    a transceiver configured to transmit and receive a signal; and a controller configured to:
  receive first configuration information associated with a first transmission point (TP) and second configuration information associated with a second TP,
  receive a first channel state information-reference signal (CSI-RS) based on the first configuration information,
  receive a second CSI-RS associated with based on the second configuration information,
  identify a subband for which an aggregated channel quality indicator (CQI) is obtained and a report timing of the aggregated CQI,
  determine a phase difference between the first (TP) and the second TP from a set of predetermined values, based on an index of the subband for which the aggregated CQI is obtained and the report timing of the aggregated CQI,
  obtain the aggregated CQI based on a precoding matrix, to which the precoding matrix being applied with the phase difference between the first TP and the second TP,
  generate aggregated channel state information (CSI) based on the first CSI-RS and the second CSI-RS, the aggregated CSI including the aggregated CQI, and
  transmit the aggregated CSI,
  wherein, in case that a first rank of the first TP and a second rank of the second TP are different, a smaller rank between the first rank and the second rank is used for obtaining the aggregated CQI.

7. The terminal of claim 6,
wherein the controller is further configured to determine a precoding matrix indicator (PMI) by using the phase difference, the first CSI-RS, and the second CSI-RS, and
wherein the aggregated CSI further comprises the PMI.

8. A first transmission point (TP) in a wireless communication system, the first transmission point comprising:
a transceiver configured to transmit and receive a signal; and
a controller configured to:
  transmit, to a terminal, first configuration information associated with the first TP,
  transmit, to the terminal, a first channel state information reference signal (CSI-RS) based on the first configuration information, and
  receive, to the terminal, aggregated channel state information (CSI) based on the first CSI-RS and a second CSI-RS associated with a second TP, the aggregated CSI including an aggregated channel quality indicator (CQI),
  wherein a subband for which the aggregated CQI is obtained and a report timing of the aggregated CQI are identified by the terminal,
  wherein a phase difference between the first TP and the second TP is determined from a set of predetermined values by the terminal, based on an index of the subband for which the aggregated CQI is obtained and the report timing of the aggregated CQI,
  wherein the aggregated CQI is obtained based on a precoding matrix, the precoding matrix being applied with the phase difference between the first TP and a second TP,
and
  wherein, in case that a first rank of the first TP and a second rank of the second TP are different, a smaller rank between the first rank and the second rank is used for obtaining the aggregated CQI.

9. The first transmission point of claim 8, wherein the controller is further configured to:
acquire the phase difference based on the index of the subband and a reception timing of the aggregated CSI, and
schedule the terminal based on the aggregated CQI and the phase difference.

10. The first transmission point of claim 9,
wherein the controller is further configured to select a phase difference for scheduling the terminal, and
wherein the phase difference for scheduling the terminal corresponds to a predetermined CQI among at least one aggregated CQIs.

\* \* \* \* \*